United States Patent [19]

Becher et al.

[11] 4,303,764

[45] Dec. 1, 1981

[54] PIGMENT DISPERSANTS FOR COATING COMPOSITIONS

[75] Inventors: David Z. Becher, Allison Park; Roger M. Christenson; Richard L. Coalson, both of Gibsonia; Percy E. Pierce, Monroeville; Karl F. Schimmel, Verona, all of Pa.

[73] Assignee: PPG Industries, Inc., Pittsburgh, Pa.

[21] Appl. No.: 166,643

[22] Filed: Jul. 7, 1980

Related U.S. Application Data

[63] Continuation of Ser. No. 938,746, Aug. 31, 1978, abandoned.

[51] Int. Cl.$^3$ .................... C08F 8/00; C08F 220/34
[52] U.S. Cl. ................... 525/327; 260/17.4 R; 260/22 CB; 260/33.2 R; 260/33.2 EP; 260/33.4 R; 260/33.4 EP; 260/33.4 UR; 260/33.6 EP; 260/33.6 UB; 260/33.6 UA; 525/328; 525/379; 525/383; 525/384; 525/386; 526/271; 526/312
[58] Field of Search .......... 260/45.52, 17.4 R, 22 CB, 260/33.2 R, 33.2 EP, 33.4 R, 33.4 EP, 33.4 UR, 33.6 EP, 33.6 UB, 33.6 UA; 526/271, 312; 528/392; 525/327, 328, 383, 384, 386

[56] References Cited

U.S. PATENT DOCUMENTS

| | | | |
|---|---|---|---|
| 2,524,432 | 10/1950 | Dorough | 526/273 |
| 2,737,452 | 3/1956 | Catlin et al. | 526/273 |
| 3,062,744 | 11/1962 | Thompson | 526/273 |
| 3,249,455 | 5/1966 | Williams | 526/312 |
| 3,290,417 | 12/1966 | Christenson | 260/901 |
| 3,893,977 | 7/1975 | Wingler | 526/273 |
| 3,893,982 | 7/1975 | Gardner et al. | 526/273 |
| 3,903,057 | 9/1975 | Gardner et al. | 526/273 |
| 3,940,353 | 2/1976 | Martorano | 260/22 CB |

FOREIGN PATENT DOCUMENTS 1393243  5/1975  United Kingdom .

Primary Examiner—Harry Wong, Jr.
Attorney, Agent, or Firm—Charles R. Wilson

[57] ABSTRACT

Pigment dispersants for use in coating compositions wherein the dispersant is the polymerization product of (i) an alkyl methacrylate having from 3 to 8 carbon atoms in the alkyl group, (ii) a hardening monomer selected from the group consisting of a styrene, methyl methacrylate, ethyl methacrylate and mixtures thereof, (iii) an ethylenically unsaturated carboxylic acid selected from the group consisting of acrylic acid, methacrylic acid, itaconic acid, crotonic acid, maleic acid, fumaric acid and mixtures thereof or a monomer having a double bond alpha-beta to a carbonyl group and which provides carboxyl functionality when reacted with water, alcohol, amine or anhydride, (iv) a monomer having a double bond alpha-beta to a carbonyl group and at least one hydroxyl group or a monomer which provides such groups when further reacted with an acid or an epoxide, and (v) a compound providing an amine or amine salt functional moiety. The dispersants are useful for dispersing pigments in coating compositions containing a wide variety of film-forming resins.

35 Claims, No Drawings

PIGMENT DISPERSANTS FOR COATING COMPOSITIONS

This is a continuation of application Ser. No. 938,746, filed Aug. 31, 1978, now abandoned.

BACKGROUND OF THE INVENTION

The subject invention relates to (1) pigment dispersants, (2) their use in pigment dispersions containing pigment and liquid carrier and (3) coating compositions containing the pigment dispersions. The dispersants are useful in the manufacture of a wide variety of pigmented resin-containing coating compositions.

Pigmented coating compositions are useful for their aesthetic as well as protective features. Such compositions contain a film-forming resin and a pigment dispersed in a liquid carrier. It is important that the pigment be satisfactorily dispersed throughout any film which results from the application of the coating composition. It is therefore desirable that the pigment be well dispersed throughout the liquid coating composition. Typically, the pigment to be used in a coating composition is first dispersed with only a portion of the total film-forming resin of which the coating composition is comprised together with appropriate liquid carriers and additives. The resulting dispersion is then mixed with the remainder of the film-forming resin and any other necessary components to produce the coating composition. Most pigment dispersants are very specific in their performance and are compatible with only a small number of the diverse solvents and film-forming resins used in coating compositions. For example, in the case of an acrylic resin based coating composition, the pigment will be first dispersed with a portion of the acrylic resin in the presence of an organic solvent. The resultant product is then further diluted with the remainder of the acrylic resin and any other necessary components forming a part of the coating composition. The final color of the coating composition is normally adjusted by small further additions of pigment dispersions containing the same or similar film-forming resins just prior to use. This further addition is normally referred to as "tinting".

A number of different film-forming resins are used in the manufacture of different coating compositions. Accordingly, heretofore it has been necessary to predisperse pigments with a portion of the film-forming resin or a resin compatible therewith, which is appropriate to each type of coating composition. That is, even though the pigmentation of two coating compositions containing different film-forming resins may be identical, it has been necessary to disperse each pigment or mixture of pigments separately with the appropriate film-forming resin. This is necessary so as to avoid any problems of incompatibility in the final coating composition. In a similar manner any tinting operation requires the use of dispersants which are compatible with the film-forming resin being used.

One solution to the aforementioned well-known problem has been the development of so-called "multi-purpose" pigment grinding vehicles. The polymeric dispersants contained in the multi-purpose pigment grinding vehicles are compatible with a wide range of film-forming resins and solvents. It can readily be recognized that a pigment grinding vehicle which can be used in many coating systems would be of significant savings to the coatings industry. Thus, one set of pigment dispersions could be used with a wide variety of coating compositions.

There have now been found dispersants based on the polymerization products of specific monomeric units which are capable of acting as multi-purpose dispersants. Such dispersants are useful for dispersing pigments and which can then be used in resin-containing coating compositions.

As used herein all percentages and ratios are by weight unless otherwise indicated.

SUMMARY OF THE INVENTION

A dispersant compatible with a variety of film-forming resins is the polymerization product of (i) from about 20 percent to about 85 percent of an alkyl methacrylate having from 3 to 8 carbon atoms in the alkyl group, (ii) from about 5 percent to about 60 percent of a hardening monomer selected from the group consisting of a styrene, methyl methacrylate, ethyl methacrylate and mixtures thereof, (iii) from about 1 percent to about 25 percent of an ethylenically unsaturated carboxylic acid selected from the group consisting of acrylic acid, methacrylic acid, itaconic acid, crotonic acid, maleic acid, fumaric acid and mixtures thereof or a monomer having a double bond alpha-beta to a carbonyl group and which provides carboxyl functionality when reacted with water, alcohol, amine or anhydride, (iv) from about 1 percent to about 25 percent of a monomer having a double bond alpha-beta to a carbonyl group and at least one hydroxyl group or a monomer which provides such groups when further reacted with an acid or epoxide, and (v) from about 0.1 percent to about 15 percent of a compound providing an amine or amine salt functional moiety; and wherein said dispersant has a weight average molecular weight as determined by gel permeation chromatography, using a polystyrene standard of from about 1,000 to about 10,000.

The above-described dispersants are especially adapted for dispersing pigments to be used in coating compositions wherein the film-forming resin is an epoxy, vinyl, alkyd, polyester, acrylic, aminoplast, phenolplast, cellulose, derivative, amide, or urethane resin or mixtures thereof.

DETAILED DESCRIPTION OF THE INVENTION

The invention herein described relates to (1) dispersants, (2) pigment dispersions containing the dispersant, pigment and liquid carrier and (3) coating compositions containing the dispersant, pigment, film-forming resin and a liquid carrier.

Dispersants

The dispersants described herein are the polymerization product of an alkyl methacrylate, a hardening monomer, an ethylenically unsaturated carboxylic acid or a monomer having a double bond alpha-beta to a carbonyl group and which provides carboxyl functionality when reacted with water, alcohol, amine or anhydride, a monomer having or providing a carbonyl group with a double bond alpha-beta to the carbonyl group and at least one hydroxyl group and a compound providing an amine or amine salt functional moiety. Each of the individual components used in forming the polymer is described in the succeeding paragraphs. The percentages of the individual components are given on the basis of the non-volatile components.

The alkyl methacrylate is used in the formation of the polymer at a level of from about 20 percent to about 85 percent, preferably from about 40 percent to about 80 percent, and more preferably from about 60 percent to about 80 percent of the reaction mixture. The alkyl methacrylates contain from 3 to 8 carbon atoms in the alkyl chain. Examples of satisfactory alkyl methacrylates include isopropyl methacrylate, butyl methacrylate, isobutyl methacrylate, isoamyl methacrylate, hexyl methacrylate, 2-ethylhexyl methacrylate and octyl methacrylate. The branched chain methacrylates are preferred with isobutyl methacrylate being the most preferred alkyl methacrylate.

A hardening monomer selected from the group consisting of a styrene, methyl methacrylate, ethyl methacrylate and mixtures thereof is used in formation of the herein described polymer at a level of from about 5 percent to about 60 percent, preferably from about 15 percent to about 40 percent, more preferably from about 20 percent to about 35 percent. A styrene, as used herein, is intended to include styrene and the substituted styrenes, e.g., alpha-methyl styrene, vinyl toluene, chlorostyrene, and tert-butylstyrene. Styrene and methyl methacrylate are the preferred hardening monomers.

From about 1 percent to about 25 percent, preferably from about 1 percent to about 20 percent, more preferably from about 1 percent to about 15 percent, of the reaction mixture comprises the ethylenically unsaturated carboxylic acid or a monomer having a double bond alpha-beta to a carbonyl group and which provides carboxyl functionality when reacted with water, alcohol, amine or anhydride. The ethylenically unsaturated carboxylic acid is selected from the group consisting of acrylic acid, methacrylic acid, itaconic acid, crotonic acid, maleic acid, fumaric acid and mixtures thereof. Acrylic acid and methacrylic acid are the preferred ethylenically unsaturated carboxylic acids.

Instead of polymerizing the ethylenically unsaturated carboxylic acid into the polymer, other monomers can be used which when further reacted provide the carboxyl functionality. Thus, alkyl acrylates such as methyl or ethyl acrylate can be polymerized into the polymer and thereafter hydrolyzed. Another technique of introducing the carboxyl functionality to the polymer is to use an unsaturated anhydride, e.g., maleic anhydride or substituted maleic anhydride, in the initial polymerization reaction followed by the opening of the anhydride with (1) water to yield a diacid, (2) an alcohol to yield an ester acid or (3) an amine to yield an amide acid. The alcohol and amine are alkyl, aryl or cycloaliphatic in nature and include methyl alcohol, ethyl alcohol, 2-ethylhexyl alcohol, the phenols and nepthols, cyclohexanol, furfuryl alcohol, ethyl amine, hexyl amine, diethyl amine, dibutyl amine, aniline, alkyl substituted anilines, piperidine and morpholine. Still another method of providing the carboxyl functionality in the polymer is to use a hydroxyl- or amine-containing monomer in preparing the polymer and thereafter react it with an anhydride. The reaction of the hydroxyl group with an anhydride gives an ester acid while the reaction of the amine group with an anhydride gives an amide acid. Monomers that provide the hydroxyl groups in the polymer include the hydroxyalkyl acrylates and methacrylates, e.g., hydroxyethyl acrylate, hydroxypropyl acrylate and hydroxyethyl methacrylate. Monomers that provide the amine groups include tert-butylaminoethyl methacrylate and aziridine reaction products which furnish amine functionality pendent from the polymer.

The polymer reaction mixture also contains from about 1 percent to about 25 percent of a monomer having a double bond alpha-beta to a carbonyl group and at least one hydroxyl group or a monomer which provides such groups when further reacted with an acid or an epoxide. The preferred level of this component ranges from about 1 percent to about 15 percent, with the more preferred level being from about one percent to about 10 percent. Examples of monomers having a double bond alpha-beta to a carbonyl group and at least one hydroxyl group are the monohydroxy alkyl acrylates, alkyl methacrylates and alkyl crotonates and the mono- and dihydroxy alkyl fumarates, itaconates, and maleates. Preferred are the hydroxyl-containing alkyl acrylates and methacrylates with the alkyl group containing from 2 carbon atoms to 20 carbon atoms, preferably from 2 carbon atoms to 6 carbon atoms. Suitable hydroxyl-containing monomers include hydroxethyl acrylate, hydroxypropyl acrylates, hydroxyethyl methacrylate and hydroxypropyl methacrylate, with hydroxyethyl acrylate being preferred.

Examples of monomers which provide the carbonyl group with the alpha-beta unsaturation and at least one hydroxyl group when reacted with an acid are the glycidyl acrylates and glycidyl methacrylates. The glycidyl acrylate or methacrylate is reacted with the other described monomers to form a polymerization product, which is then reacted with an acid such as acetic acid, lauric acid, benzoic acid, or nicotinic acid to open te epoxide ring. It will be recognized that a nitrogen-containing acid used to open the epoxide ring can also be used to introduce the amine functional moiety (as below discussed) to the dispersant. The resultant polymerization product contains a carbonyl group with alpha-beta unsaturation to a carbonyl group and at least one hydroxyl group.

Monomers which provide a carbonyl group with the alpha-beta unsaturation and at least one hydroxyl group when reacted with an epoxide are acrylic and methacrylic acid. Thus, a polymer which is formed as described herein using acrylic or methacrylic acid as monomer (iv) is formed and then reacted with an epoxide. Suitable epoxides include styrene oxide, glycidol, ethylene oxide, propylene oxide 1,2- and 2,3-butylene oxide, butyl glycidyl ether, phenyl glycidyl ether and a glycidyl ester of a saturated $C_{9-11}$ tertiary monocarboxylic acid. The reaction of the acrylic or methacrylic units of the interpolymer with the epoxide results in the formation on the polymer of a carbonyl group with the alpha-beta unsaturation and at least one hydroxyl group.

A fifth component used in the formation of the polymer is a compound capable of providing an amine or amine salt functional moiety. This compound is used at a level ranging from about 0.1 percent to about 15 percent, preferably from about 0.5 percent to about 3 percent of the polymer reaction mixture. The amine salt functional moiety can be provided by an aliphatic or alicyclic amine which forms a salt with the carboxyl moiety of the interpolymer compound. Examples thereof include oleylamine, cyclohexylamine, dimethylbenzylamine, dimethylethanolamine, diethylethanolamine and stearylamine. One source of amine functional moieties is provided by an acrylic or methacrylic compound containing amino groups, e.g., dimethylaminoethyl methacrylate, ethyl-, propyl- and t-butylaminoethyl acrylate and t-butylaminoethyl methacrylate or 2- and 4-vinyl pyridine. Such compounds are polymerized into the backbone of the interpolymer. Additionally, the amine functional moiety can be provided by the inclusion of a nitrogen-containing ring opening compound in the polymerization reaction mixture. Such compounds are represented by the following formula:

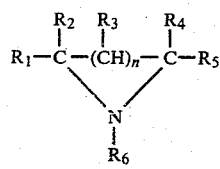

where $R_1$, $R_2$, $R_4$, $R_5$, and $R_6$ are each hydrogen; alkyl having up to 20 carbon atoms, e.g., methyl, ethyl or propyl; aryl, e.g., phenyl; alkaryl, e.g., tolyl or xylyl; or aralkyl, e.g., benzyl or phenethyl. $R_3$ is hydrogen or a lower alkyl having from 1 to 6 carbon atoms and n is 0 or 1. Examples of suitable compounds useful herein include: ethylenimine (aziridine), 1,2-propylenimine, 1,3-propylenimine, 1,2-dodecylenimine, 1,1-dimethyl ethylenimine, phenyl ethylenimine, benzyl ethylenimine, tolyl ethylenimine, hydroxyethyl ethylenimine, aminoethyl ethylenimine, 2-methyl propylenimine, N-ethyl ethylenimine, N-phenyl ethylenimine and N-tolyl ethylenimine. The preferred compounds are the alkylenimines having 2 to 4 carbon atoms, especially ethylenimine and 1,2-propylenimine.

The polymers are made by conventional solution polymerization of the aforedescribed individual components in an inert organic solvent. A so called "one shot" procedure can be used wherein each of the individual monomers is present at the start of the polymerization reaction. The reaction is conducted at a temperature of from about 80° C. to about 160° C., preferably from about 120° C. to about 145° C. for from about 45 minutes to about 6 hours, preferably about 90 minutes to about 2½ hours. Examples of suitable inert organic solvents include the following: ether-type alcohols, e.g., ethylene glycol monobutyl ether, ethylene glycol monoethyl ether and propylene glycol monobutyl ether, ethanol, propanol, isopropanol and butanol. The polymerization is carried out in the presence of a vinyl polymerization catalyst. Preferred catalysts are the azo compounds, e.g., alpha, alpha'-azobis(isobutyronitrile), tertiary butyl perbenzoate, tertiary butyl pivalate, isopropyl percarbonate and benzoyl peroxide. It should be recognized that the resultant reaction product can be isolated or have a part of the solvent removed. Preferably, however, the solvent is retained for convenience in later forming the pigment dispersion and the coating composition containing same.

The resultant polymers have a weight average molecular weight determined by gel permeation chromatography, using a polystyrene standard, of from about 1,000 to about 10,000, preferably from about 2,000 to about 6,000. A molecular weight below about 1,000 is to be avoided inasmuch as the resultant polymer is too brittle and will not possess the desired set of properties. Similarly, a molecular weight above about 10,000 indicates formation of a product which does not possess the desired set of dispersing properties or appropriate compatibility. As above discussed, the molecular weight of the polymer is determined by gel permeation chromatography using a polystyrene standard. Determination of molecular weights of polymers in this manner is well known.

The mixture of monomers used to make the above-described dispersant can additionally consist essentially of a monomer selected from the group consisting of alkyl esters of acrylic acid wherein the alkyl group contains from 3 to 20 carbon atoms, alkyl esters of methacrylic acid wherein the alkyl group contains from 9 to 20 carbon atoms and mixtures thereof. The level of this monomer ranges from about 1 percent to about 30 percent, preferably from about 5 percent to about 20 percent of the reaction mixture. The inclusion of this monomer is to maintain flexibility or aid in compatibility when so desired.

Pigment Dispersion Compositions

The aforedescribed dispersants permit the prior preparation of dispersions of pigments or pigment mixtures which are subsequently used in coating compositions. Each of the dispersions can be employed for the direct pigmentation of coating compositions. The pigment dispersions can be prepared at any convenient time and stored for future use.

The pigment dispersions of this invention consist essentially of from about 1 percent to about 50 percent, preferably from about 3 percent to about 30 percent of the aforedescribed dispersant, from about 10 percent to about 90 percent, preferably about 15 percent to about 80 percent of a pigment and the balance a liquid carrier. Pigments useful herein include those conventionally used in the coatings industry. Examples of suitable pigments include the ion oxides, lead chromates, silicochromate, stronium chromate, lead carbonate, lead sulfate, barium carbonate, china clay, calcium carbonate, aluminum silica, zinc oxide, zinc sulfide, zirconium oxide, antimony oxide, titanium dioxide, chrome green, chrome yellow, thio-indigo red, phthalo blue, phthalo green, cobalt blue, cadmium yellow, cadmium red, toluidene red, graphite, carbon black, metallic aluminum, and metallic zinc.

The solvents used in the pigment dispersions are conveniently the solvents used in the reaction of the monomers to form the interpolymer. However, other solvents can be added, such as xylene or mineral spirits.

The pigment dispersions can contain other additives commonly used in pigment dispersions, for example, plasticizers, wetting agents, defoamers, diluents and flow control agents.

Pigment dispersions are made by grinding or dispersing the pigment into the dispersant. The grinding is usually accomplished by the use of ball mills, sand mills, Cowles dissolvers, continuous attritors and the like, until the pigment has been reduced to the desired size. After grinding, the particle size of the pigment is in the range of about 10 microns or less.

Coating Composition

The pigment dispersions described above are added to coating compositions either by the manufacturer and/or just prior to use by the consumer as a tinting composition. The pigment dispersions are compatible with a wide variety of film-forming resins and do not adversely affect the properties of a dried film made from the coating compositions. In particular, films made from the compositions of this invention have good color development and intercoat adhesion, i.e., have the ability to adhere to a previously formed film. This latter feature is difficult to attain and represents an especially important feature possessed by the compositions herein.

Useful coating compositions consist essentially of from about 25 percent to about 98 percent, preferably about 30 percent to about 80 percent of the film-forming resin, from about 1 percent to about 70 percent, preferably about 20 percent to about 60 percent of the pigment, from about 1 percent to about 50 percent, preferably about 2 percent to about 30 percent of the dispersant and the balance liquid carrier. Suitable film-forming resins used in conjunction with the pigment dispersions are described in the succeeding paragraphs. The film-forming resin can be an epoxy, vinyl, alkyd, polyester, acrylic, aminoplast, phenolplast, cellulose derivative, amide or urethane resin or mixtures thereof. Copolymers derived from such resins are also useful herein.

The epoxide resins used as a film-forming resin in the coating compositions are those compounds having a 1,2-epoxy group, i.e.,

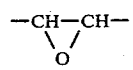

present in the molecule. Polyepoxides contain more than one 1,2-epoxy group per molecule. In general, the epoxide equivalent weight will range from about 140 to about 4,000. These polyepoxides are saturated or unsaturated, cyclic or acyclic, aliphatic, alicyclic, aromatic or heterocyclic. They can contain substituents such as halogen, hydroxyl and ether groups.

One useful class of polyepoxides comprises the epoxy polyethers obtained by reacting an epihalohydrin (such as epichlorohydrin or epibromohydrin) with a polyphenol in the presence of an alkali. Suitable polyphenols include resorcinol, catechol, hydroquinone, bis(4-hydroxyphenyl)-2,2-propane, i.e., bisphenol A; bis(4-hydroxyphenyl)-1,1-isobutane; 4,4-dihydroxybenzophenone; bis(4-hydroxyphenyl)-1,1-ethane; bis(2-hydroxynaphenyl)-methane; and 1,5-hydroxynaphthalene. One very common polyepoxide is a polyglycidyl ether of a polyphenol, such as bisphenol A.

Another class of epoxy resins are the polyglycidyl ethers of polyhydric alcohols. These compounds may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, trimethylolpropane, and bis(4-hydroxycyclohexyl)-2,2-propane.

Another class of epoxide resins are the polyglycidyl esters of polycarboxylic acids. These compounds are produced by the reaction of epichlorohydrin or a similar epoxy compound with an aliphatic or aromatic polycarboxylic acid such as oxalic acid, succinic acid, glutaric acid, terephthalic acid, 2,6-naphthalene dicarboxylic acid and dimerized linoleic acid.

Still another class of polyepoxides are derived from the epoxidation of an olefinically unsaturated alicyclic compound. These polyepoxides are non-phenolic and are obtained by epoxidation of alicyclic olefins, for example, by oxygen and selected metal catalysts, by perbenzoic acid, by acid-aldehyde monoperacetate or by peracetic acid. Among such polyepoxides are the epoxy alicyclic ethers and esters well known in the art.

Useful polyepoxides also include those containing oxyalkylene groups in the epoxy molecule. Such oxyalkylene groups have the general formula:

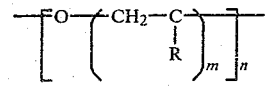

where R is hydrogen or alkyl, preferably a lower alkyl having from 1 to 6 carbon atoms, m is 1 to 4 and n is 2 to 50. Such groups are pendant to the main molecular chain of the polyepoxide or are part of the main chain itself. The proportion of oxyalkylene groups in the polyepoxide depends upon many factors, including the chain length of the oxyalkylene group, the nature of the epoxy and the degree of water solubility desired.

Another class of polyepoxides consists of the epoxy novolac resins. These resins are obtained by reacting an epihalohydrin with the condensation product of aldehyde and monohydric or polyhydric phenols. A typical example is the reaction product of epichlorohydrin with a phenolformaldehyde condensate.

Any well-known curing reactant for the above-described epoxy resins is normally included in the coating compositon. It is well known chemicals and resins containing functional groups with active hydrogen groups are useful as curing agents for the epoxy resins. Generally, the curing agents cause polymerization by cross-linking of the epoxy molecules. Amine and polyamide catalysts are especially preferred curing agents.

Vinyl resins used in the coating compositions are derived from monomers containing a carbon to carbon double bond. These monomers polymerize by linear addition to form long chain molecules. Generally, the polymeric resins have the structure:

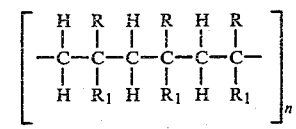

where R and $R_1$ represent various pendant groups such as hydrogen, chlorine, acetate, benzene and toluene. The vinyl resins are commonly derived from the monomers vinyl chloride, vinylidene chloride, vinyl acetate, the vinyl acetals, styrene, acrylonitrile and mixtures thereof. The vinyl polymers and copolymers range from about 100 to 10,000 carbon atoms in chain length and can be formed by bulk, solvent, suspension or emulsion polymerization.

Copolymers derived from mixtures of any of the aforedescribed vinyl monomers either with themselves or with other commonly used polymerizable monomers are used herein. Such copolymers possess a wide range of properties and can be formulated to fit individual needs.

One class of resins especially useful herein are the alkyd resins. Such resins are polyesters of polyhydroxyl alcohols and polycarboxyl acids chemically combined with various drying, semi-drying and non-drying oils in different proportions. Thus, for example, the alkyd resins are made from polycarboxylic acids such as phthalic acid, maleic acid, fumaric acid, isophthalic acid, succinic acid, adipic acid, azelaic acid, sebacic acid as well as from anhydrides of such acids, where they exist. The polyhydric alcohols which are reacted with the polycarboxylic acid include glycerol, trimethylolethane, trimethylolpropane, pentaerythritol, sorbitol, mannitol, ethylene glycol, diethylene glycol and 2,3-butylene glycol.

The alkyd resins are produced by reacting the polycarboxylic acid and the polyhydric alcohol together with a drying, semi-drying or non-drying oil in proportions depending upon the properties desired. The oils are coupled into the resin molecule by esterification during the manufacturing and become an integral part of the polymer. The oil is fully saturated or predominately unsaturated. The fully saturated oils tend to give a plasticizing effect to the alkyd, whereas the predominately unsaturated oils tend to cross-link and dry rapidly with oxidation to give more tough and durable alkyd resins. Suitable oils include coconut oil, fish oil, linseed oil, tung oil, castor oil, cottonseed oil, safflower oil, soybean oil, and tall oil. Various proportions of the polycarboxylic acid, polyhydric alcohol and oil are used to obtain alkyd resins of various properties.

Also useful herein are polyester type resins. As conventionally used and as used herein, the term "polyester" is applied to resins which contain no oil or fatty acid modification. That is, while the above-described alkyd resins are in the broadest sense polyester type resins, they are oil-modified and thus not generally considered a polyester resin. The polyesters are of two kinds. The more common are the unsaturated polyesters derived from unsaturated polyfunctional acids and polyhydric alcohol. These polyesters are essentially linear in structure. Maleic acid and fumaric acid are the usual unsaturated acid components. Commonly used polyhydric alcohols are ethylene glycol, propylene glycol, diethylene glycol, dipropylene glycol, butylene glycol, glycerol, trimethylol propane, pentaerythritol and sorbitol. Oftentimes a saturated acid will be included in the reaction to provide desirable properties. Examples of saturated acids include phthalic acid, isophthalic acid, adipic acid, azelaic acid, sebacic acid and the anhydrides thereof when they exist. The saturated polyesters are derived from saturated or aromatic polyfunctional acids, preferably dicarboxylic acids, and mixtures of polyhydric alcohols having an average hydroxyl functionality greater than 2.

Useful acrylic resins are the polymerized ester derivatives of acrylic acid and methacrylic acid. The resins contain the units

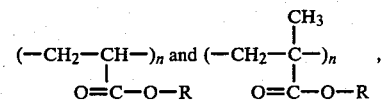

respectively. The esters are formed by the reaction of acrylic or methacrylic acid with suitable alcohols, e.g., methyl alcohol, ethyl alcohol, propyl alcohol, butyl alcohol and 2-ethylhexyl alcohol. Generally speaking, the larger the alcohol portion of the ester, the softer and more flexible the resultant resin. Also, generally speaking, the methacrylate esters form harder films than the corresponding acrylic esters. Monomers such as styrene, vinyl toluene, vinyl chloride and vinylidine chloride may be reacted with the acrylic and methacrylic esters so as to produce resins with excellent properties.

Thermosetting acrylic resins are normally low molecular weight copolymers made from 2 and sometimes 3 monomers. One of the monomers is an acrylic compound containing pendant reactive groups such as carboxyl, hydroxyl or amide. Another is an acrylic ester. The third monomer is usually a styrene type monomer such as styrene itself, vinyl toluene, methyl styrene or ethyl styrene. The proportions of the three components in the polymerization procedure are varied depending on the products in which the copolymer will be used.

Another class of film-forming resins useful in the coating compositions herein is the amino resins commonly referred to as aminoplasts. The amino resins are made by the reaction of an amine with an aldehyde. The more important and preferred amines are urea and melamine. The aldehyde component comprises from 1 to 4 carbon atoms, with formaldehyde being the preferred aldehyde. Films of varying properties can be obtained by changing the proportions of the amine and aldehyde and by adding various chemically-reactive materials during the resin formation. Oftentimes, a lower alcohol, especially butanol, is added during the resin formation to impart desirable properties to the amino resin.

The phenolic resin commonly referred to as phenoplasts are also useful film-formers in the context of the subject invention. The phenolic resins are obtained by the condensation of phenol or substituted phenols with aldehydes. The monohydric phenols such as phenol, cresol and xylanol are the most important since they are readily available and relatively inexpensive. Phenol is the most preferred monohydric phenol. Polyhydric phenols such as resorcinol can also be used herein. Formaldehyde is the preferred aldehyde used in the production of the phenolic resins. Other aldehydes which are also useful include acetaldehyde, butyraldehyde and furfuraldehyde. The preferred phenolic resin is produced by the condensation of phenol and formaldehyde.

Different cellulose derivatives useful herein include nitrocellulose, cellulose acetate, cellulose acetate butyrate and ethyl cellulose. These film-forming materials are well known and are commercially available in varying degrees of substitution and molecular weight. Nitrocellulose is the preferred cellulose derivative.

Amide resins found to be useful include those polymers made by condensing a diamine with a dibasic acid. They are characterized by recurring amide groups, —CONH—, as an integral part of the main polymer chain. Examples of diamines used in producing the polyamide resins include ethylenediamine, diethylenetriamine and hexamethylenediamine. The carboxylic acids are the preferred dibasic acids and include adipic acid, sebacic acid, succinic acid, glutaric acid and azelaic acid.

Another class of film-formers used in the invention herein are the urethane resins. These are synthetic polymers that may be either thermoplastic or thermosetting. The basic polymeric unit is RNHCOOR. The R groups can be the same or different and can contain other reactive groups, for example, a second —NCO group, a second —OH group, etc. Typically, a polyhydric alcohol is reacted with a polyisocyanate to produce the urethane resin. Useful polyhydric alcohols include ethylene glycol, propylene glycol, butylene glycol, glycerol, trimethylolpropane and hexane triol. Many variations are possible.

The urethane coating can be made from a one-pack or two-pack system. The one-pack urethane contains either an isocyanate prepolymer or a blocked isocyanate. The prepolymers are prepared by the reaction of excess diisocyanate with a polyhydric alcohol. Blocked isocyanates contain no free isocyanate groups and are relatively inactive at room temperature. At elevated temperatures, the compounds dissociate and undergo reactions typical of isocyanates. Typical blocking agents are phenols, thiols, tertiary alcohols and secondary aromatic amines. In a two-pack coating system, typically a polyester polyol and an isocyanate (or isocyanate prepolymer for safety reasons) are mixed at the time of application and applied immediately.

It will be recognized that a great many copolymers based upon the above-described monomers are possible. Such copolymers possess a wide range of properties and can be formulated to fit individual needs. The copolymers are contemplated herein as being useful film-forming resins compatible with the resin dispersants of this invention.

The balance of the compositons comprises a liquid carrier material. Many different organic solvents are suitable, examples of which include hydrocarbons and halogenated hydrocarbons such as toluene, xylene, mineral spirits, n-hexane, cyclohexane, chlorobenzene, and perchloroethylene.

Additives commonly used in coating compositions can be used herein also. Such additives include plasticizers, fillers, surfactants and stabilizers.

The coating compositions are applied by conventional coating techniques onto a variety of substrates. Thus, the compositions can be applied by spraying, brushing, dipping, flow coating and roll coating. Substrates that can be coated include wood, metals, glass, plastics and wallboard.

The examples which follow are illustrative of the invention. All molecular weights given are determined by gel permeation chromatography using a polystyrene standard.

EXAMPLE I

Isobutyl methacrylate: 1117 grams
Methyl methacrylate: 466.5 grams
Acrylic acid: 42.1 grams
Dimethyloctadecylamine: 37.2 grams
Hydroxyethyl acrylate: 42.1 grams
2-Mercaptoethanol: 25 grams
Tertiary butyl perbenzoate (TBPB): 116.8 grams
Ethylene glycol monobutyl ether: 1525.7 grams
Denatured ethyl alcohol: 30 grams A reaction vessel is set up equipped with heating means, stirring means, means for maintaining a nitrogen blanket throughout the reaction and refluxing means. A solvent blend of 1346 grams ethylene glycol monobutyl ether and the denatured alcohol is heated to reflux under a nitrogen blanket. At the reflux temperature a stream of the isobutyl methacrylate, methyl methacrylate, hydroxyethyl acrylate, acrylic acid and 2-mercaptoethanol and another stream of 83.4 grams of TBPB and 118 grams of ethylene glycol monobutyl ether are added to the reaction mixture over a period of two hours. This mixture is held at reflux for one hour after the separate streams have been charged to the reaction vessel. Thereafter, the reaction is cooled to 120° C. at which time 33.4 grams of TBPB and 61.7 grams of ethylene glycol monobutyl ether are added over a period of one hour. This mixture is then held one hour at 120° C. The resultant reaction mixture contains 50 percent solids and has a Gardner-Holdt viscosity of H-I. The amine functional salt of the resin dispersant is formed by adding the dimethyloctadecyl amine to the reaction mixture.

The dispersant has a weight average molecular weight of 2200.

EXAMPLE II

The following components are utilized in forming a resin dispersant:
Isobutyl methacrylate: 1278.9 grams
Methyl methacrylate: 302.9 grams
Methacrylic acid: 42.1 grams
Hydroxyethyl acrylate: 42.1 grams
Dimethylaminoethyl methacrylate: 16.8 grams
2-Mercaptoethanol: 50.5 grams
Ethylene glycol monobutyl ether: 1573.3 grams
Denatured ethyl alcohol: 33.7 grams
Tertiary butyl perbenzoate (TBPB): 84.1 grams A reaction vessel is set up equipped with heating means, stirring means, means for maintaining a nitrogen blanket throughout the reaction and refluxing means. A solvent blend of 1346.1 grams of the ethylene glycol monobutyl ether and the denatured ethyl alcohol is heated to reflux under a nitrogen blanket. At the reflux temperature a stream of the methacrylic acid, hydroxyethyl acrylate, isobutyl methacrylate, methyl methacrylate, dimethylaminoethyl methacrylate, 2-mercaptoethanol and 50.5 grams of ethylene glycol monobutyl ether and another separate stream of 75.7 grams of the TBPB and 75.7 grams of the ethylene glycol monobutyl ether are added to the reaction mixture over a period of two hours. This mixture is held at reflux for one hour after the separate streams have been charged to the reaction vessel. Thereafter, the reaction is cooled to 120° C. at which time 8.4 grams of TBPB and 176.7 grams of ethylene glycol monobutyl ether are added over a periiod of one hour. This mixture is then held for one hour at 120° C.

The resultant mixture has a solids content of 49.6 percent and a Gardner-Holdt viscosity of E-F. The dispersant has a molecular weight of 1100.

EXAMPLE III

A reaction vessel is equipped as in Example I. The following components are used in the reaction:
Isobutyl methacrylate: 1100.0 grams
Methyl methacrylate: 466.5 grams
Acrylic acid: 42.1 grams
Hydroxyethyl acrylate: 42.1 grams
Dimethylaminoethyl methacrylate: 16.7 grams
2-Mercaptoethanol: 16.7 grams
Propasol B: 1521.1 grams
Denatured ethyl alcohol: 30.0 grams
Ethyl alcohol: 72.9 grams
Tertiary butyl perbenzoate (TBPB): 84.1 grams Propasol B is an isomeric mixture of n-butoxy propanol available from the Union Carbide Corp.

The reaction vessel is initially charged with 1346.1 grams of Propasol B and the denatured ethyl alcohol. This solvent mixture is heated to reflux, i.e., about 145° C. Thereafter over the next two hours, separate streams of (1) the acrylic acid, hydroxyethyl acrylate, isobutyl methacrylate, methyl methacrylate, dimethylaminoethyl methacrylate, 2-mercaptoethanol and 50.5 grams of the Propasol B and (2) 75.7 grams of the TBPB and 75.7 grams Propasol B are added. The temperature is adjusted to 120° C. with the ethyl alcohol. Over the next one hour, 8.4 grams of TBPB and 103.8 grams of Propasol B are added. This mixture is then held for one hour and cooled.

The reaction mixture is comprised of 49.5 percent solids and has a Gardner-Holdt viscosity of K-L. The dispersant has a molecular weight of 2200.

EXAMPLE IV

The following components are used to produce a resin dispersant:

Isobutyl methacrylate: 1278.9 grams
Methyl methacrylate: 302.9 grams
Methacrylic acid: 58.9 grams
Hydroxyethyl acrylate: 42.1 grams
2-Mercaptoethanol: 50.5 grams
Ethylene glycol monobutyl ether: 1648.0 grams
Tertiary butyl perbenzoate (TBPB): 84.1 grams
Propylenimine: 10.8 grams
Denatured ethyl alcohol: 33.7 grams A reaction vessel is set up as in Example I. Initially, 1346.1 grams of ethylene glycol monobutyl ether and 33.7 grams of the denatured ethyl alcohol are charged to the reaction vessel and heated to 144° C. Thereafter separate streams of (1) the methacrylic acid, hydroxyethyl acrylate, methyl methacrylate, 2-mercaptoethanol and 50.5 grams of the ethylene glycol monobutyl ether and of (2) 75.7 grams of TBPB and 75.7 grams of the ethylene glycol monobutyl ether are added to the reaction vessel. The temperature during this addition is maintained at 140° C. with the addition made over a period of about 2 hours. The mixture is cooled to 120° C. with ethanol and 177 grams of ethylene glycol monobutyl ether and 8.4 grams of TBPB are added over one hour. The reaction is cooled to 55° C. and when this temperature is reached, the propylenimine is added and the reaction mixture held at 65°–70° C. for a time period of two hours.

The reaction mixture is analyzed and found to contain 50.9 percent solids. It has a Gardner-Holdt viscosity of G-H. The dispersant's weight average molecular weight is 2600.

EXAMPLE V

A resin dispersant is made following the procedure of Example IV except acrylic acid is used in place of the methacrylic acid, 1100.0 grams of the isobutyl methacrylate is used instead of the 1278.9 grams and 471.2 grams of the methyl methacrylate is used instead of the 302.9 grams. The final reaction mixture contains 50 percent solids. The dispersant's weight average molecular weight is 3000.

EXAMPLE VI

A resin dispersant is made following the procedure of Example III except 933.7 grams of 2-ethylhexyl methacrylate is used in place of the isobutyl methacrylate and 633.6 grams, instead of 466.5 grams, of methyl methacrylate is used. The dispersant's weight average molecular weight is 4600.

EXAMPLE VII

Example III is repeated except butyl methacrylate is used in place of the isobutyl methacrylate, at the same level. The resultant solution containing the resin dispersant has a solids content of 49.6 percent. The weight average molecular weight of the dispersant is 5600.

EXAMPLE VIII

Another resin dispersant is made following the procedure of Example IV except 1083.8 grams butyl methacrylate is used in place of the isobutyl methacrylate, 466.5 grams methyl methacrylates is used and 55.8 grams of acrylic acid is used in place of the methacrylic acid. The dispersant's weight average molecular weight is 5800.

EXAMPLE IX

A resin dispersant using butyl methacrylate and styrene in place of isobutyl methacrylate and methyl methacrylate, respectively, and at equal levels is made using the procedure described in Example III. The resultant dispersant's weight average molecular weight is 5600.

EXAMPLE X

The dispersant of Example III is used to formulate pigment dispersions having the following compositions:

|  | Pigment Percent | Dispersant Percent | Solvent Percent |
|---|---|---|---|
| Black tint (1) | 20 | 16 | 64 |
| White tint (2) | 74 | 5.2 | 20.8 |
| Yellow tint (3) | 55 | 9 | 36 |
| Red tint (4) | 68 | 6.4 | 25.6 |
| Blue tint (5) | 20 | 16 | 64 |
| Green tint (6) | 18 | 16.4 | 65.6 |

(1) The pigment is a #6 Lamp Black available from General Carbon Co.
(2) The pigment is Titantium Dioxide R 960 available from E. I. Dupont De Nemours & Co., Inc.
(3) The pigment is Yellow Iron Oxide 1888D available fro Pfizer Inc.
(4) The pigment is Red Iron Oxide R-3098 available from Pfizer Inc.
(5) The pigment is Phthalo Blue BT 425D available from E. I. Dupont De Nemours & Co., Inc.
(6) The pigment is Phthalo Green GT 751D available from E. I.Dupont De Nemours & Co., Inc.

The solvent is an isomeric mixture of n-butoxy propanol available from Union Carbide Corp. as Propasol B.

The pigment dispersions are made by first premixing the pigment, dispersant and solvent on a Cowles mixer for about 20 minutes to form a well wetted uniform mix. Next, the premix is ground on a Sussmeyer mill until the resultant paste possesses a Hegmann Grind Gauge reading of +7. Optionally, a portion of the dispersant and solvent is held back from the initial premixing step and is used to wash down the Sussmeyer mill. The wash is added to the previously milled paste to form pastes having the above compositions.

EXAMPLE XI

The pigment dispersion of this invention is tested for tint compatibility with paints containing different film-forming resins as described below. The pigment dispersion used in this example is the black tint pigment dispersion of Example X.

| | Film-Forming Resin Type | Percent Film-Former | Percent Pigment Dispersion | Percent Volatile Carriers, Flow Control Agents, etc. |
|---|---|---|---|---|
| (A) | 80 percent tall oil fatty acid alkyd resin cross-linked with 20 percent aminoplast (1) | 37.2 | 6.2 | Balance |
| (B) | Acrylic resin (2) | 32.5 | 5.4 | " |
| (C) | Vinyl toluene alkyd copolymer (3) | 24.8 | 4.1 | " |
| (D) | Acrylic/epoxy copolymer (4). | 20.7 | 3.5 | " |
| (E) | Plasticized acrylic lacquer (5) | 22.4 | 3.7 | " |
| (F) | Vinyl resin (6) | 28.2 | 4.7 | " |

-continued

|  | Film-Forming Resin Type | Percent Film-Former | Percent Pigment Dispersion | Percent Volatile Carriers, Flow Control Agents, etc. |
|---|---|---|---|---|
| (G) | Medium oil alkyd resin (7) | 30.4 | 5.1 | " |
| (H) | Acrylic/melamine copolymer (8) | 29.7 | 4.9 | " |
| (I) | Nitrocellulose/ alkyd lacquer (9) | 16.7 | 2.8 | " |

(1) The aminoplast is available from Monsanto Co. as Resimine 735.
(2) The acrylic resin is an internally cross-linked acrylic resin found in PPG Industries, Inc. DURACRON 200.
(3) A vinyl toluated alkyd resin.
(4) A 90:10 blend of an internally cross-linked acrylic resin of Example (B) and EPON 1001, available from Shell Chemical Co.
(5) An air dry lacquer acrylic resin having imine modification made by PPG Industries, Inc.
(6) A resin blend of 78 percent of a solution vinyl resin and 22 percent of a chlorinated paraffin.
(7) Derived from 59 percent soya oil, 29 percent phthalic anhydride and 12 percent pentaerythritol.
(8) A hydroxy functional acrylic resin cross-linked with an aminoplast.
(9) A 35/65 blend of nitrocellulose solution and tall oil fatty acid glycerol alkyd resin.

Compatibility of the pigment dispersions with the film-forming resins in the respective paints and their effect on the properties of a formed film are determined using a series of tests. Initially, the paints are shaken for 10 to 15 minutes and allowed to digest overnight. Then 1.0 to 1.2 mil (dry) films of the paints on steel panels are formed by spraying.

Compatibility is determined by a rub-up test. While the films on the above-described steel panels are still wet, they are rubbed with the forefinger. Any lightening of the color is noted. A noticeable change in color between the rubbed portion of the wet film and the unrubbed portion is an indication of incompatibility of the pigment dispersions in the paint. The following rub-up values are obtained based on a 0 to 10 scale with 0 being no change in color and 5 being the value above which a significant color change and hence a compatibility problem is experienced.

| Paint | Rub-Up |
|---|---|
| (A) | 3 |
| (B) | 1 |
| (C) | 1 |
| (D) | 3 |
| (E) | 2 |
| (F) | 2 |
| (G) | 2 |
| (H) | 1 |
| (I) | 1 |

The above results show that the pigment dispersion of this invention is compatible with a wide variety of film-forming resins.

The effect the pigment dispersions have on the properties of the formed films is determined using a (1) direct and reverse impact test, (2) pencil hardness test, and (3) intercoat adhesion test. The impact tests are conducted using a Gardner Variable Impact Tester. The pencil hardness test is a measure of the film's hardness. A hardness value is assigned a film based on its ability to withstand pressure applied by a pencil having a specified grade of lead. The intercoat adhesion test measures the ability of the formed film to adhere to a previously coated substrate.

In all instances, coating compositions (A)–(I) have substantially equivalent or better properties than controls where the above described pigment dispersions are omitted.

EXAMPLE XII

Resin dispersants made from the compounds indicated in the chart (expressed as percents) are tested for compatibility and their effect on film properties of a paint containing them. Resin dispersants A, B, C, D, E, F and G correspond with the dispersants of Examples III, V, I, VI, VII, VIII and IX, respectively.

| Resin dispersant | A | B | C | D | E | F | G |
|---|---|---|---|---|---|---|---|
| Isobutyl methacrylate | 66 | 66 | 66 | — | — | — | — |
| 2-Ethylhexyl methacrylate | — | — | — | 56 | — | — | — |
| Butyl methacrylate | — | — | — | — | 66 | 65.5 | 66 |
| Methyl methacrylate | 28 | 28 | 27 | 38 | 28 | 28 | — |
| Styrene | — | — | — | — | — | — | 28 |
| Acrylic acid | 2.5 | 2.5 | 2.5 | 2.5 | 2.5 | 2.5 | 2.5 |
| Hydroxyethyl acrylate | 2.5 | 2.5 | 2.5 | 2.5 | 2.5 | 2.5 | 2.5 |
| Amino functional moiety (1) | 1 | — | — | 1 | 1 | — | 1 |
| Amino functional moiety (2) | — | 1 | — | — | — | 1.5 | — |
| Amino functional moiety (3) | — | — | 2 | — | — | — | — |

(1) The amino functional moiety is provided by polymerizing dimethylaminoethyl methacrylate into the resin dispersant's polymeric backbone.
(2) The amino functional moiety is provided by an aziridine ring opening reaction.
(3) An amine salt of the resin dispersant is formed from the dispersant and dimethyloctodecyl amine.

The above resin dispersants are tested by adding them at a 6 percent level to (1) an internally cross-linked acrylic resin based paint and (2) an alkyd/melamine based paint. Values for color development, rub-up and intercoat adhesion are obtained. The color development value is a measure of the resin dispersant's efficiency as determined by its ability to evenly disperse pigment throughout the dried film. A value of 1 is excellent, 10 poor and 5 marginally acceptable.

| Cross-linked Acrylic Resin Based Paint | | | |
|---|---|---|---|
| Resin Dispersant | Color Development | Rub-Up | Adhesion |
| A | 4 | 3 | o.k. |
| B | 4 | 2 | o.k. |
| C | 3 | 2 | o.k. |
| D | 2 | 1 | o.k. |
| E | 2 | 2 | o.k. |
| F | 2 | 3 | o.k. |
| G | 2 | 1 | o.k. |

| Alkyd/Melamine Resin Based Paint | | | |
|---|---|---|---|
| Resin Dispersant | Color Development | Rub-Up | Adhesion |
| A | 1 | 3 | o.k. |
| B | 3 | 3 | o.k. |
| C | 2 | 3 | o.k. |
| D | 2 | 3 | o.k. |
| E | 2 | 3 | o.k. |
| F | 2 | 3 | o.k. |
| G | 2 | 3 | o.k. |

The above results show the resin dispersants of this invention perform satisfactorily as pigment dispersants, are compatible with the tested coating composition and do not have an adverse effect on the formed film's intercoat adhesion.

What is claimed is:

1. A dispersant compatible with a variety of resin-containing coating compositions and especially adapted for dispersing pigments therein, said dispersant being the polymerization product of a mixture of monomers consisting essentially of:
   (i) from about 20 percent to about 85 percent of an alkyl methacrylate having from 3 to 8 carbon atoms in the alkyl group;
   (ii) from about 5 percent to about 60 percent of a hardening monomer selected from the group consisting of a styrene, methyl methacrylate, ethyl methacrylate and mixtures thereof;
   (iii) from about 1 percent to about 25 percent of an ethylenically unsaturated carboxylic acid selected from the group consisting of acrylic acid, methacrylic acid, itaconic acid, crotonic acid, maleic acid, fumaric acid and mixtures thereof;
   (iv) from about 1 percent to about 25 percent of a monomer having a double bond alpha-beta to a carbonyl group and at least one hydroxyl group selected from the group consisting of a monohydroxy alkyl acrylate, monohydroxy alkyl methacrylate, monohydroxy alkyl crotonate, monohydroxy alkyl fumarate, dihydroxy alkyl fumarate, monohydroxy alkyl itaconate, dihydroxy alkyl itaconate, monohydroxy alkyl maleate, dihydroxy alkyl maleate and mixtures thereof; and
   (v) from about 0.1 percent to about 15 percent of a compound providing an amine functional moiety, said compound being an acrylic or methacrylic compound containing amino groups; and wherein said dispersant has a weight average molecular weight, determined by gel permeation chromatography, using a polystyrene standard, of from about 1,000 to about 10,000.

2. A dispersant compatible with a variety of resin-containing coating compositions and especially adapted for dispersing pigments therein, said dispersant being the polymerization product of a mixture of monomers consisting essentially of:
   (i) from about 20 percent to about 85 percent of an alkyl methacrylate having from 3 to 8 carbon atoms in the alkyl group;
   (ii) from about 5 percent to about 60 percent of a hardening monomer selected from the group consisting of a styrene, methyl methacrylate, ethyl methacrylate and mixtures thereof;
   (iii) from about 1 percent to about 25 percent of a monomer having a double bond alpha-beta to a carbonyl group, said monomer being an alkyl acrylate;
   (iv) from about 1 percent to about 25 percent of a monomer having a double bond alpha-beta to a carbonyl group and at least one hydroxyl group selected from the group consisting of a monohydroxy alkyl acrylate, monohydroxy alkyl methacrylate, monohydroxy alkyl crotonate, monohydroxy alkyl fumarate, dihydroxy alkyl fumarate, monohydroxy alkyl itaconate, dihydroxy alkyl itaconate, monohydroxy alkyl maleate, dihydroxy alkyl maleate and mixtures thereof; and
   (v) from about 0.1 percent to about 15 percent of a compound providing an amine functional moiety, said compound being an acrylic or methacrylic compound containing amino groups; wherein the said polymerization product is further reacted with water to provide carboxyl functionality from units provided by the alkyl acrylate monomer and wherein said dispersant has a weight average molecular weight, determined by gel permeation chromatography, using a polystyrene standard, of from about 1,000 to about 10,000.

3. A dispersant compatible with a variety of resin-containing coating compositions and especially adapted for dispersing pigments therein, said dispersant being the polymerization product of a mixture of monomers consisting essentially of:
   (i) from about 20 percent to about 85 percent of an alkyl methacrylate having from 3 to 8 carbon atoms in the alkyl group;
   (ii) from about 5 percent to about 60 percent of a hardening monomer selected from the group consisting of a styrene, methyl methacrylate, ethyl methacrylate and mixtures thereof;
   (iii) from about 1 percent to about 25 percent of a monomer having a double bond alpha-beta to a carbonyl group, said monomer being an unsaturated carboxylic anhydride;
   (iv) from about 1 percent to about 25 percent of a monomer having a double bond alpha-beta to a carbonyl group and at least one hydroxyl group selected from the group consisting of a monohydroxy alkyl acrylate, monohydroxy alkyl methacrylate, monohydroxy alkyl crotonate, monohydroxy alkyl fumarate, dihydroxy alkyl fumarate, monohydroxy alkyl itaconate, dihydroxy alkyl itaconate, monohydroxy alkyl maleate, dihydroxy alkyl maleate and mixtures thereof; and
   (v) from about 0.1 percent to about 15 percent of a compound providing an amine functional moiety, said compound being an acrylic or methacrylic compound containing amino groups; wherein the said polymerization product is further reacted with water, alcohol or amine to provide carboxyl functionality from units provided by the unsaturated carboxylic anhydride monomer and wherein said dispersant has a weight average molecular weight, determined by gel permeation chromatography, using a polystyrene standard of from about 1,000 to about 10,000.

4. A dispersant compatible with a variety of resin-containing coating compositions and especially adapted for dispersing pigments therein, said dispersant being the polymerization product of a mixture of monomers consisting essentially of:
   (i) from about 20 percent to about 85 percent of an alkyl methacrylate having from 3 to 8 carbon atoms in the alkyl group;
   (ii) from about 5 percent to about 60 percent of a hardening monomer selected from the group consisting of a styrene, methyl methacrylate, ethyl methacrylate and mixtures thereof;
   (iii) from about 1 percent to about 25 percent of a monomer having a double bond alpha-beta to a carbonyl group, said monomer being a hydroxyl-containing monomer;
   (iv) from about 1 percent to about 25 percent of a monomer having a double bond alpha-beta to a carbonyl group and at least one hydroxyl group selected from the group consisting of a monohydroxy alkyl acrylate, monohydroxy alkyl methacrylate, monohydroxy alkyl crotonate, monohydroxy alkyl fumarate, dihydroxy alkyl fumarate, monohydroxy alkyl itaconate, dihydroxy alkyl itaconate, monohydroxy alkyl maleate, dihydroxy alkyl maleate and mixtures thereof; and (v) from about 0.1 percent to about 15 percent of a compound providing an amine functional moiety, said compound being an acrylic or methacrylic compound containing amino groups; wherein the said polymerization product is further reacted with an anhydride to provide carboxyl functionality from units provided by the hydroxy-containing monomer and wherein said dispersant has a weight average molecular weight, determined by gel permeation chromatography, using a polystyrene standard, of from about 1,000 to about 10,000.

5. A dispersant compatible with a variety of resin-containing coating compositions and especially adapted for dispersing pigments therein, said dispersant being the polymerization product of a mixture of monomers consisting essentially of:
(i) from about 20 percent to about 85 percent of an alkyl methacrylate having from 3 to 8 carbon atoms in the alkyl group;
(ii) from about 5 percent to about 60 percent of a hardening monomer selected from the group consisting of a styrene, methyl methacrylate, ethyl methacrylate and mixtures thereof;
(iii) from about 1 percent to about 25 percent of a monomer having a double bond alpha-beta to a carbonyl group, said monomer being an amine-containing monomer;
(iv) from about 1 percent to about 25 percent of a monomer having a double bond alpha-beta to a carbonyl group and at least one hydroxyl group selected from the group consisting of a monohydroxy alkyl acrylate, monohydroxy alkyl methacrylate, monohydroxy alkyl crotonate, monohydroxy alkyl fumarate, dihydroxy alkyl fumarate, monohydroxy alkyl itaconate, dihydroxy alkyl itaconate, monohydroxy alkyl maleate, dihydroxy alkyl maleate and mixtures thereof; and
(v) from about 0.1 percent to about 15 percent of a compound providing an amine functional moiety, said compound having an acrylic or methacrylic compound containing amino groups; wherein the said polymerization product is further reacted with an anhydride to provide carboxyl functionality from units provided by the amine-containing monomer and wherein said dispersant has a weight average molecular weight, determined by gel permeation chromatography, using a polystyrene standard, of from about 1,000 to about 10,000.

6. The dispersant of claim 1, 2, 3, 4 or 5 being the polymerization product of a mixture of monomers consisting essentially of:
(i) from about 40 percent to about 80 percent of the alkyl methacrylate having from 3 to 8 carbon atoms in the alkyl group;
(ii) from about 15 percent to about 40 percent of the hardening monomer;
(iii) from about 1 percent to about 20 percent of the ethylenically unsaturated carboxylic acid or the monomer which provides the carboxyl functionality when further reacted;
(iv) from about 1 percent to about 15 percent of the monomer having a double bond alpha-beta to the carbonyl group and at least one hydroxyl group; and
(v) from about 0.5 percent to about 3 percent of the compound providing an amine functional moiety.

7. The dispersant of claim 6 wherein monomer (iv) is a hydroxyl-containing alkyl acrylate or alkyl methacrylate wherein the alkyl group contains from 2 to 20 carbon atoms.

8. The dispersant of claim 7 wherein monomer (iii) is the ethylenically unsaturated carboxylic acid.

9. The dispersant of claim 8 wherein the alkyl methacrylate is a branched chain methacrylate.

10. The dispersant of claim 9 wherein the alkyl methacrylate is isobutyl methacrylate.

11. The dispersant of claim 9 wherein the hardening monomer is styrene or methyl methacrylate.

12. The dispersant of claim 11 wherein the ethylenically unsaturated carboxylic acid is acrylic acid or methacrylic acid.

13. The disperant of claim 3 wherein monomer (iv) is a hydroxyl-containing alkyl acrylate or alkyl methacrylate containing from 2 to 6 carbon atoms in the alkyl group.

14. The dispersant of claim 13 wherein monomer (iv) is hydroxyethyl acrylate.

15. The dispersant of claim 6 additionally consisting essentially of from about 1 percent to about 30 percent of a monomer selected from the group consisting of alkyl esters of acrylic acid wherein the alkyl group contains from 3 to 20 carbon atoms, alkyl esters of methacrylic acid wherein the alkyl group contains from 9 to 20 carbon atoms and mixtures thereof.

16. The dispersant of claim 12 being the polymerization product of a mixture of monomers consisting essentially of:
(i) from about 60 percent to about 80 percent of the alkyl methacrylate having from 3 to 8 carbon atoms in the alkyl group;
(ii) from about 20 percent to about 35 percent of the hardening monomer;
(iii) from about 1 percent to about 15 percent of the ethylenically unsaturated carboxylic acid;
(iv) from about 1 percent to about 10 percent of the monomer having a double bond alpha-beta to the carbonyl group and at least one hydroxyl group; and
(v) from about 0.5 percent to about 3 percent of the compound providing an amine functional moiety.

17. The dispersant of claim 16 wherein the alkyl methacrylate is isobutyl methacrylate, the hardening monomer is styrene or methyl methacrylate, the ethylenically unsaturated carboxylic acid is acrylic acid or methacrylic acid and the monomer having the carbonyl group and the alpha-beta unsaturation to the carbonyl group is hydroxyethyl acrylate.

18. The dispersant of claim 17 wherein the dispersant has a weight average molecular weight of from about 2,000 to about 6,000.

19. A pigment dispersion composition adapted for dispersing pigments in a film-forming resin-containing coating composition wherein said pigment dispersion composition consists essentially of:
(a) from about 1 percent to about 50 percent of the dispersant of claims 1, 2, 3, 4 or 5;
(b) from about 10 percent to about 90 percent of a pigment; and
(c) the balance a liquid carrier.

20. The composition of claim 19 wherein the dispersant is the polymerization product of a mixture of monomers consisting essentially of:
(i) from about 40 percent to about 80 percent of the alkyl methacrylate having from 3 to 8 carbon atoms in the alkyl group;

(ii) from about 15 percent to about 40 percent of the hardening monomer;

(iii) from about 1 percent to about 20 percent of the ethylenically unsaturated carboxylic acid or the monomer which provides the carboxyl functionality when further reacted;

(iv) from about 1 percent to about 15 percent of the monomer having a double bond alpha-beta to the carbonyl group and at least one hydroxyl group; and (v) from about 0.5 percent to about 3 percent of the compound providing an amine functional moiety.

21. The composition of claim 20 wherein monomer (iv) is a hydroxyl-containing alkyl acrylate or alkyl methacrylate wherein the alkyl group contains from 2 to 20 carbon atoms.

22. The composition of claim 20 monomer (iii) is the ethylenically unsaturated carboxylic acid.

23. The composition of claim 22 wherein the alkyl methacrylate is a branched chain methacrylate.

24. The composition of claim 23 wherein the alkyl methacrylate is isobutyl methacrylate.

25. The composition of claim 23 wherein the hardening monomer is styrene or methyl methacrylate.

26. The composition of claim 25 wherein the ethylenically unsaturated carboxylic acid is acrylic acid or methacrylic acid.

27. The composition of claim 21 wherein monomer (iv) is a hydroxyl-containing alkyl acrylate or alkyl methacrylate containing from 2 to 6 carbon atoms in the alkyl group.

28. The composition of claim 27 wherein monomer (iv) is hydroxyethyl acrylate.

29. The composition of claim 20 wherein the dispersant additionally consists essentially of from about 1 percent to about 30 percent of a monomer selected from the group consisting of alkyl esters of acrylic acid wherein the alkyl group contains from 3 to 20 carbon atoms, alkyl esters of methacrylic acid wherein the alkyl group contains from 9 to 20 carbon atoms and mixtures thereof.

30. The composition of claim 26 wherein the dispersant is the polymerization product of:

(i) from about 60 percent to about 80 percent of the alkyl methacrylate having from 3 to 8 carbon atoms in the alkyl group;

(ii) from about 20 percent to about 35 percent of the hardening monomer;

(iii) from about 1 percent to about 15 percent of the ethylenically unsaturated carboxylic acid;

(iv) from about 1 percent to about 10 percent of the monomer having a double bond alpha-beta to the carbonyl group and at least one hydroxyl group; and (v) from about 0.5 percent to about 3 percent of the compound providing an amine functional moiety.

31. The composition of claim 30 wherein the alkyl methacrylate is isobutyl methacrylate, the hardening monomer is styrene or methyl methacrylate, the ethylenically unsaturated carboxylic acid is acrylic acid or methacrylic acid and the monomer having the alpha-beta unsaturation to the carbonyl group is hydroxyethyl acrylate.

32. The composition of claim 31 wherein the dispersant has a molecular weight of from about 2,000 to about 6,000.

33. The composition of claim 20 consisting essentially of:

(a) from about 3 percent to about 30 percent of the dispersant;

(b) from about 15 percent to about 80 percent of the pigment; and (c) the balance a liquid carrier.

34. The composition of claim 33 wherein the carrier is an organic solvent.

35. The composition of claim 19 wherein the pigment is ground into the dispersant.

* * * * *